(12) United States Patent
Scholl et al.

(10) Patent No.: US 11,993,367 B2
(45) Date of Patent: May 28, 2024

(54) AIRCRAFT, AND THE PRODUCTION THEREOF

(71) Applicant: Dr. Ing. h.c. F. Porsche Aktiengesellschaft, Stuttgart (DE)

(72) Inventors: Patrick Scholl, Bietigheim-Bissingen (DE); Jens-Ole Thoebel, Hankensbuettel (DE); Christian Wenzel, Untergruppenbach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 319 days.

(21) Appl. No.: 17/394,436

(22) Filed: Aug. 5, 2021

(65) Prior Publication Data

US 2022/0041274 A1 Feb. 10, 2022

(30) Foreign Application Priority Data

Aug. 10, 2020 (DE) ...................... 10 2020 121 031.0

(51) Int. Cl.
*B64U 30/295* (2023.01)
*B64C 11/00* (2006.01)
*B64C 29/00* (2006.01)
*B64D 27/24* (2006.01)
*B64F 5/10* (2017.01)

(52) U.S. Cl.
CPC ........ *B64C 29/0016* (2013.01); *B64C 11/001* (2013.01); *B64D 27/24* (2013.01); *B64F 5/10* (2017.01); *B64U 30/295* (2023.01)

(58) Field of Classification Search
CPC .. B64C 11/001; B64C 29/0025; B64U 30/295
See application file for complete search history.

(56) References Cited

U.S. PATENT DOCUMENTS

| | | | |
|---|---|---|---|
| 3,088,695 A | 5/1963 | Clark | |
| 3,335,977 A | 8/1967 | Meditz | |
| 7,712,701 B1 * | 5/2010 | Ehrmantraut | ......... B64C 39/024 244/17.23 |

(Continued)

FOREIGN PATENT DOCUMENTS

| CN | 205076045 U | 3/2016 |
|---|---|---|
| CN | 205770158 U | 12/2016 |

(Continued)

OTHER PUBLICATIONS

Michael Duffy, et al., "Propulsion Scaling Methods in the Era of Electric Flight", 2018 AIAA/IEEE Electric Aircraft Technologies Symposium, Jul. 9-11, 2018, pp. 1-24, AIAA Propulsion and Energy Forum, Cincinnati, Ohio, USA.

*Primary Examiner* — Nicholas McFall
*Assistant Examiner* — Terri L Filosi
(74) *Attorney, Agent, or Firm* — LEYDIG, VOIT & MAYER, LTD.

(57) ABSTRACT

An aircraft includes wings having integrated ducted fans. The integrated ducted fans each have a duct with a stiffness ring. Each stiffness ring is made up of stiffness boxes and circular-arc-shaped ring segments. The stiffness boxes can include first stiffness boxes and second stiffness boxes, and the first stiffness boxes and second stiffness boxes differ in terms of height.

11 Claims, 9 Drawing Sheets

(56) References Cited

U.S. PATENT DOCUMENTS

| | | | | |
|---|---|---|---|---|
| 2003/0006611 | A1* | 1/2003 | Shuey | F16L 23/12 |
| | | | | 285/364 |
| 2003/0085319 | A1* | 5/2003 | Wagner | B64C 27/20 |
| | | | | 244/12.3 |
| 2013/0026304 | A1 | 1/2013 | Wang | |
| 2017/0158322 | A1 | 6/2017 | Ragland | |
| 2022/0389939 | A1* | 12/2022 | Hakuta | F04D 29/665 |

FOREIGN PATENT DOCUMENTS

| | | |
|---|---|---|
| CN | 106628161 A | 5/2017 |
| DE | 1200140 B | 9/1965 |
| DE | 1205392 B | 11/1965 |
| DE | 1209001 B | 1/1966 |
| DE | 202015003815 U1 | 7/2015 |
| EP | 2193993 A2 | 6/2010 |
| JP | 2019172125 A | 10/2019 |
| JP | 2020040566 A | 3/2020 |
| WO | WO 2005032939 A1 | 4/2005 |
| WO | WO 2007033994 A1 | 3/2007 |
| WO | WO 2016190753 A1 | 12/2016 |

\* cited by examiner

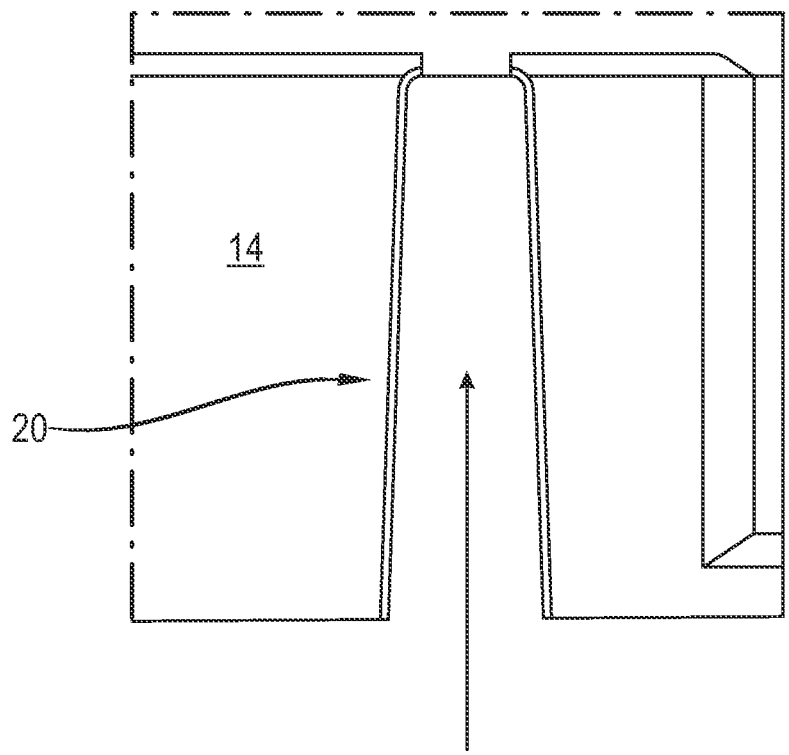
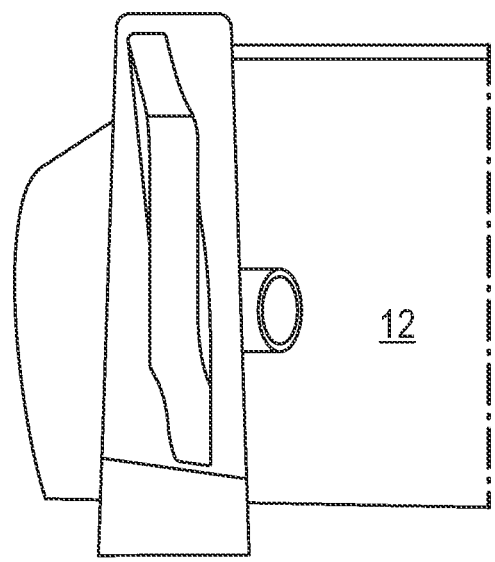
Fig. 8

AIRCRAFT, AND THE PRODUCTION THEREOF

CROSS REFERENCE TO RELATED APPLICATIONS

This application claims benefit to German Patent Application No. DE 10 2020 121 031.0, filed on Aug. 10, 2020, which is hereby incorporated by reference herein.

FIELD

The present disclosure relates to an aircraft, in particular a fully electric vertical take-off and landing (VTOL) aircraft, and to an advantageous method for producing such an aircraft.

BACKGROUND

VTOL is the cross-language name given in the aerospace industry to any type of aircraft, drone or rocket that has the capability of lifting off and landing again substantially vertically and without a runway. This collective term is used below in a broad sense that includes not just fixed-wing aircraft with wings, but rather also rotary-wing aircraft such as helicopters, gyrocopters, gyrodynes and hybrids such as composite or combination helicopters and convertiplanes. Short take-off and landing (STOL) aircraft, short take-off and vertical landing (STOVL) aircraft and vertical take-off and horizontal landing (VTHL) aircraft are also included.

EP 2 193 993 A2 discloses a fan duct which is made up substantially of two annular components.

WO 2005/032939 A1 proposes the production of a fan duct in a segmented construction in the manner of a modular system.

U.S. Pat. No. 7,712,701 B1 and CN 205770158 U describe fan ducts which are produced from individual circumferential segments.

SUMMARY

In an embodiment, the present disclosure provides an aircraft. The aircraft includes wings having integrated ducted fans. The integrated ducted fans each have a duct with a stiffness ring. Each stiffness ring is made up of stiffness boxes and circular-arc-shaped ring segments.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 7 to 9 illustrate the fitted connection between duct and guide grille.

DETAILED DESCRIPTION

The present disclosure provides an aircraft, in particular a fully electric vertical take-off and landing aircraft in the above sense, and a method for producing such an aircraft.

The approach according to the present disclosure is based on the insight that a VTOL aircraft that can be used in urban environments requires drive units in different positions and orientations, which drive units are on the one hand capable of handling every phase of flight (take-off, transition, cruise and landing) and resisting any elastic deformation under load, but on the other hand do not exceed a manageable number of individual parts.

For the lift of the aircraft, it is the case here that, instead of an exposed rotor, ducted fans are provided which are integrated into the wing surface, such as are known, outside the aerospace sector, for example from hovercraft or swamp craft. The cylindrical housing of the air channel—hereinafter referred to as duct—reduces the shear losses that arise owing to turbulence at the blade tips of such a ducted fan.

According to the present disclosure, this duct supports a stiffness ring which is of modular construction—that is to say constructed in accordance with a modular principle—and which is made up of stiffness boxes and circular-arc-shaped ring segments, in order to save costs and nevertheless provide the duct with high geometrical accuracy and stiffness.

Further advantageous configurations are described herein. For example, multiple construction variants of the duct may be provided, wherein, in each variant, the duct supports two uniform ring segments. The number of identical parts of the stiffness ring can be maximized in this way.

Figure 1:
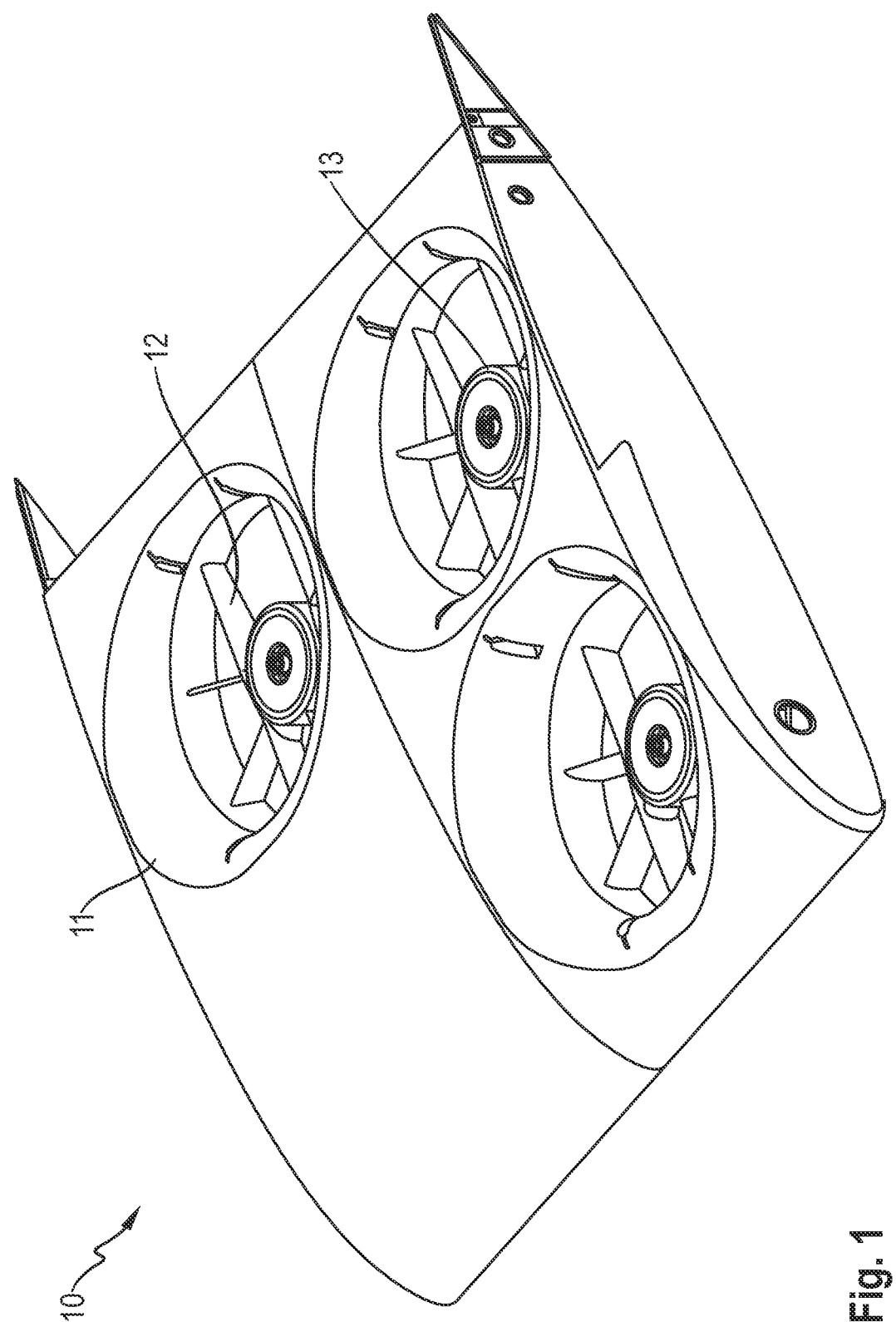
FIG. 1 shows the isometric view of a wing with partially transparent cladding and outer skin.

FIG. 1 illustrates the construction of a wing (10) for a selectively fully autonomously or manually controlled aircraft, which wing is divided approximately into quadrants by spars and ribs. In three of these quadrants, there is integrated in each case one ducted fan, the guide grille (12) of which, arranged within the duct, supports a central electric motor (13). For this purpose, the three cylindrical electric motors (13) are screwed radially to the respective guide grille (12) such that the struts thereof, manufactured from carbon-fiber-reinforced plastic (CFRP), are capable of supporting the electric motor (13) in an axially and rotationally symmetrical arrangement from opposite sides. Each duct is made up of inlet modules (11) and outlet modules (14, not indicated in FIG. 1).

In the illustrated configuration, two of the struts of each guide grille (12) run parallel to one another in the incident-flow direction of the wing (10) and tangentially flank the associated electric motor (13). In each case two beams, joined to said webs, combine with the beams of the respective other web, which are situated diametrically oppositely in relation to the motor (13), to form a St Andrew's or diagonal cross and stiffen the electric motor (13) such that the guide grille (12) accommodates all horizontal forces in the plane of the motor. As is suggested in the figure, the struts of the guide grille (12) have, for this purpose, a width which corresponds approximately to the height of the electric motor (13).

Figure 2:
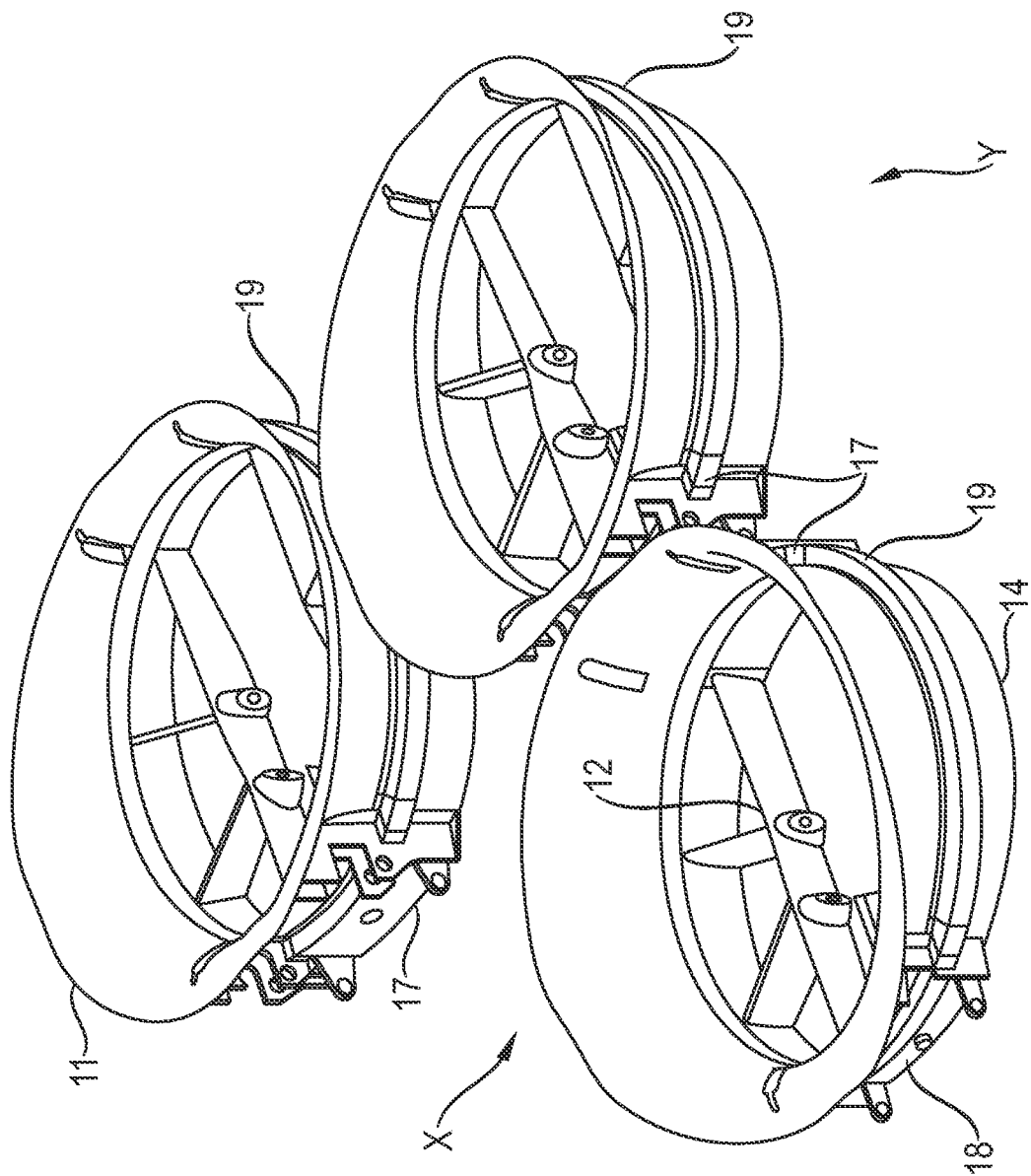
FIG. 2 shows the isometric view of the ducted fans of the wing without motor.
Figure 3:
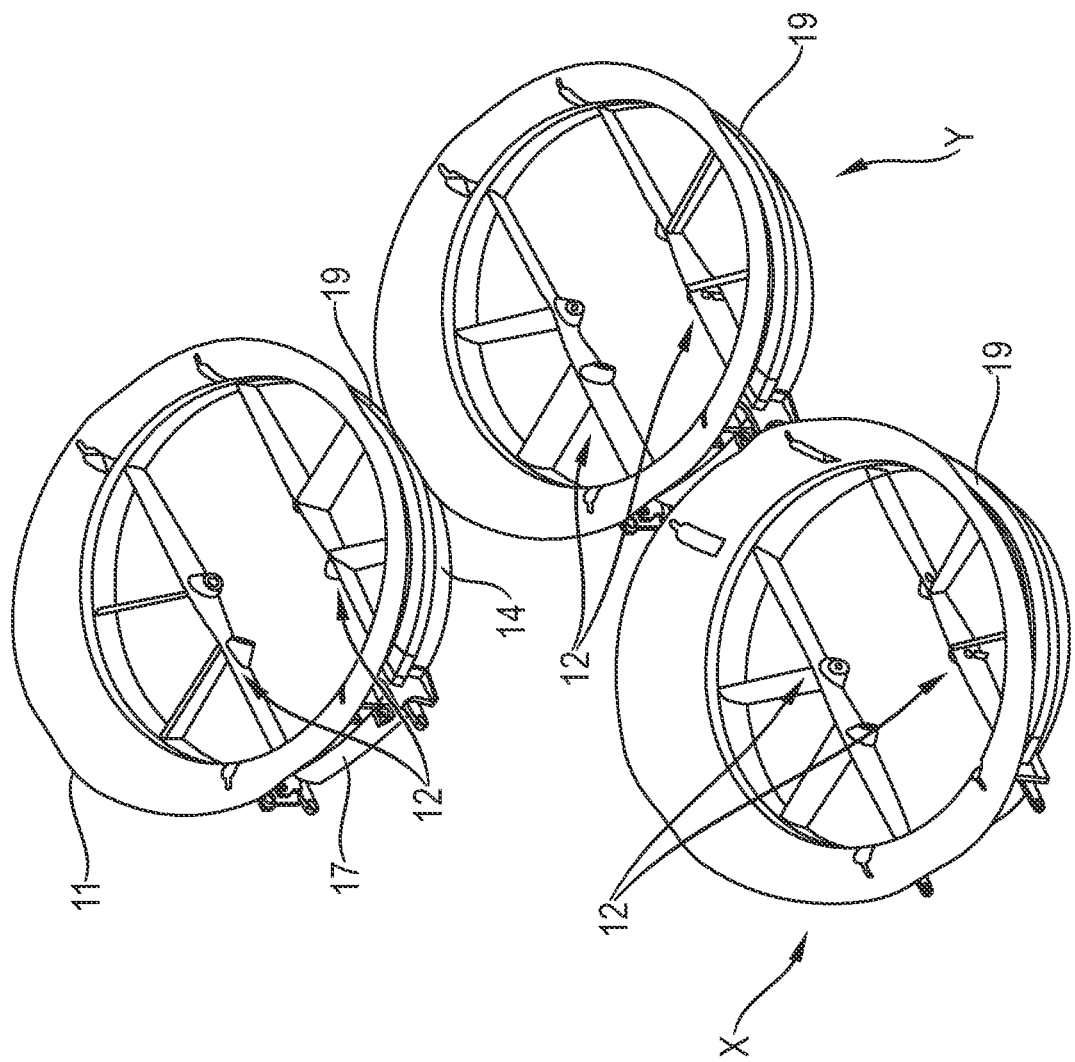
FIG. 3 shows a view, corresponding to FIG. 2, from an elevated perspective.
Figure 4:
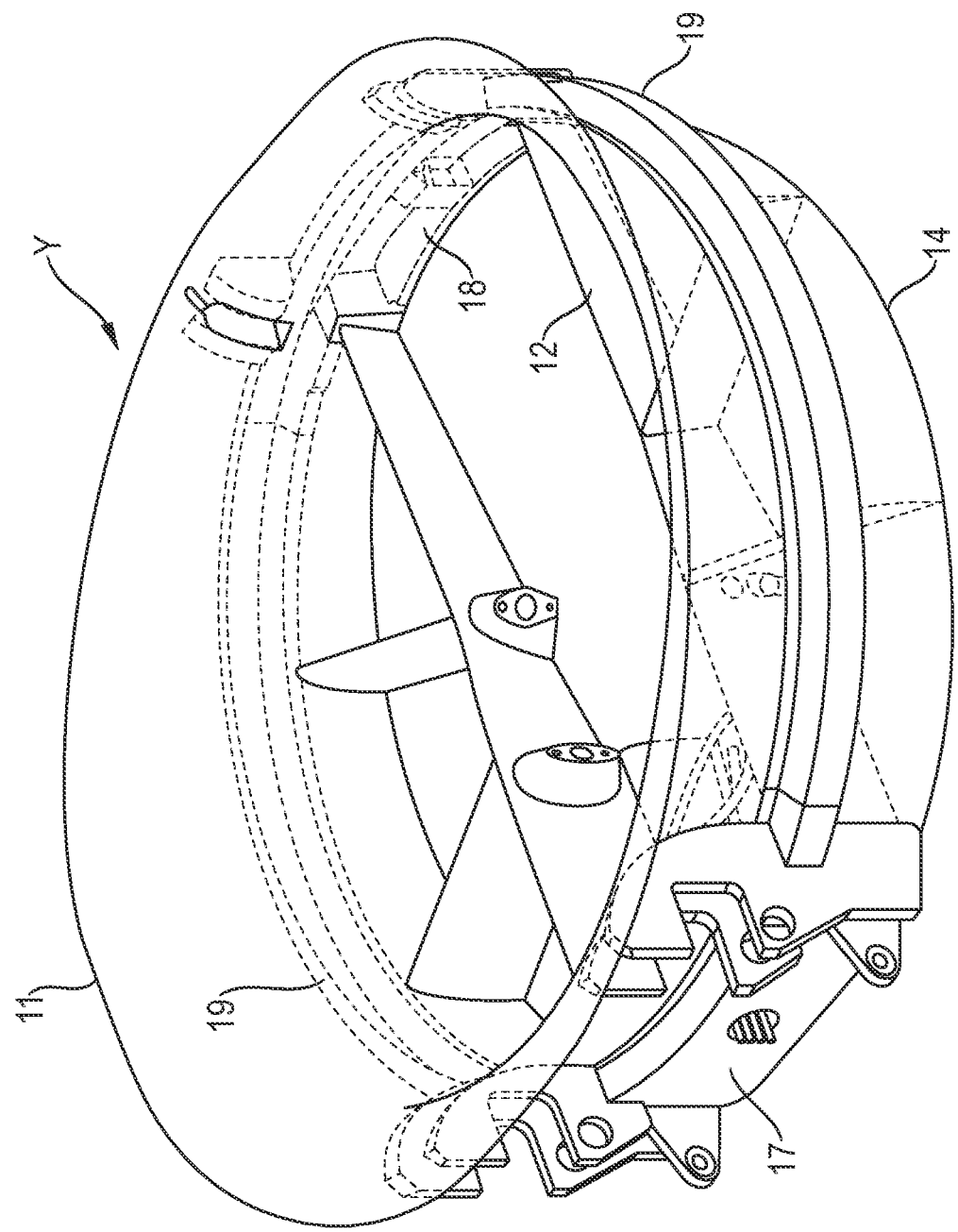
FIG. 4 shows the isometric view of a fan with partially transparent inlet and outlet.

FIGS. 2 and 3 illustrate the different construction variants (X, Y) of the duct. This formation of variants is made possible by means of the modular system illustrated in FIG.

4 on the basis of the construction variant Y, in which the duct, which is made up in the present case of inlet modules (11) and outlet modules (14), is stiffened by means of a multi-part ring, made up of a first stiffness box 17, a second stiffness box 18, and ring segments 19.

In particular, in the embodiment shown, the multi-part stiffness ring made up of relatively tall first stiffness boxes (17), relatively shallow second stiffness boxes (18), and two circular-arc-shaped ring segments (19) which connect the first stiffness box (17) on diametrically opposite sides of the duct to the second stiffness box (18).

Said stiffness ring (17, 18, 19) is in turn made up of relatively tall first stiffness boxes (17), relatively shallow second stiffness boxes (18), and two circular-arc-shaped ring segments (19) which connect the first stiffness box (17) on diametrically opposite sides of the duct (11, 14) to the second stiffness box (18).

Figure 5:
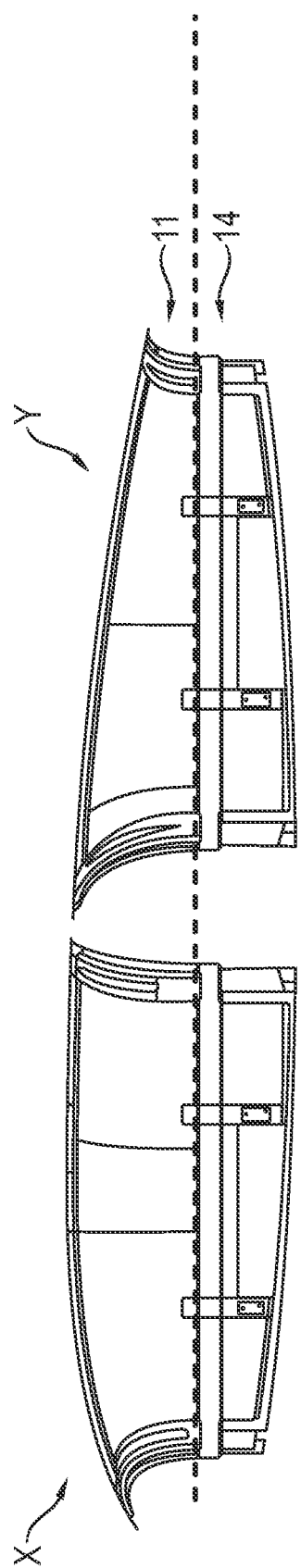
FIG. 5 shows the front view of two duct parts in different construction variants.

The reason for the different heights of the first (17) and second stiffness boxes (18) becomes evident from the illustration of FIG. 5: As can be clearly seen here, the outlet module (14) also has a height which varies over its circumference and which necessitates adapted shaping of the stiffness boxes (17, 18) provided at opposite circumferential positions.

Figure 6:
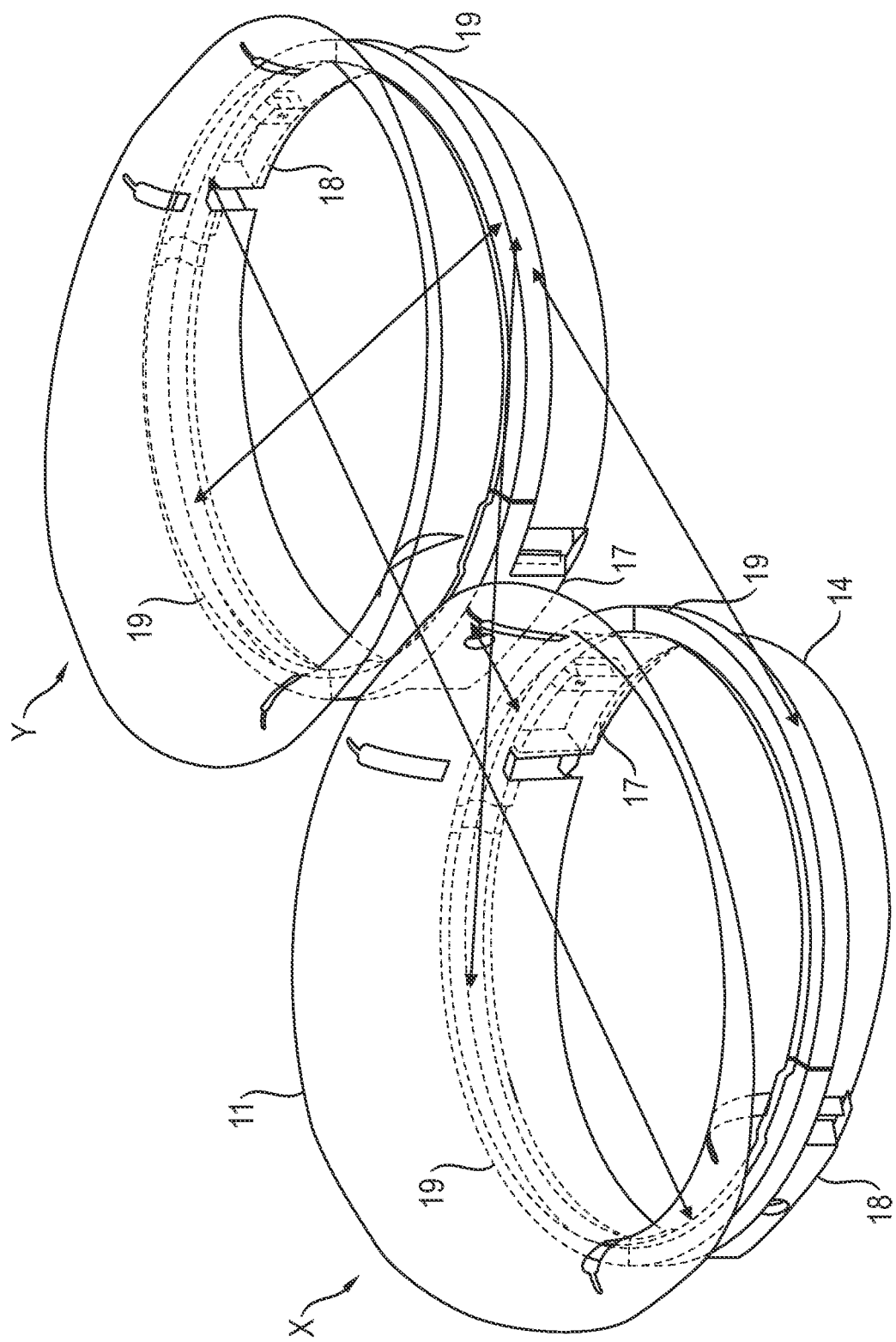
FIG. 6 shows an isometric view of two ducts with partially transparent inlet and outlet.

FIG. 6 illustrates the possible combinations of the described individual elements to form stiffness rings (17, 18, 19) in two different construction variants (X, Y). For example, the universal interfaces of the two modules make it possible for each of the ducts, to connect two of the uniform ring segments (19) to in each case one of the first stiffness boxes (17) and second stiffness boxes (18) in a freely selectable arrangement. The ducts are comprised of inlet modules (11) and outlet modules (14). In the present configuration, it is for example the case that two adjacent ducts of different construction variants (X, Y) are oriented relative to one another such that the first stiffness boxes (17) of the two ducts face toward one another, but their second stiffness boxes (18) are averted from one another.

Figure 7:
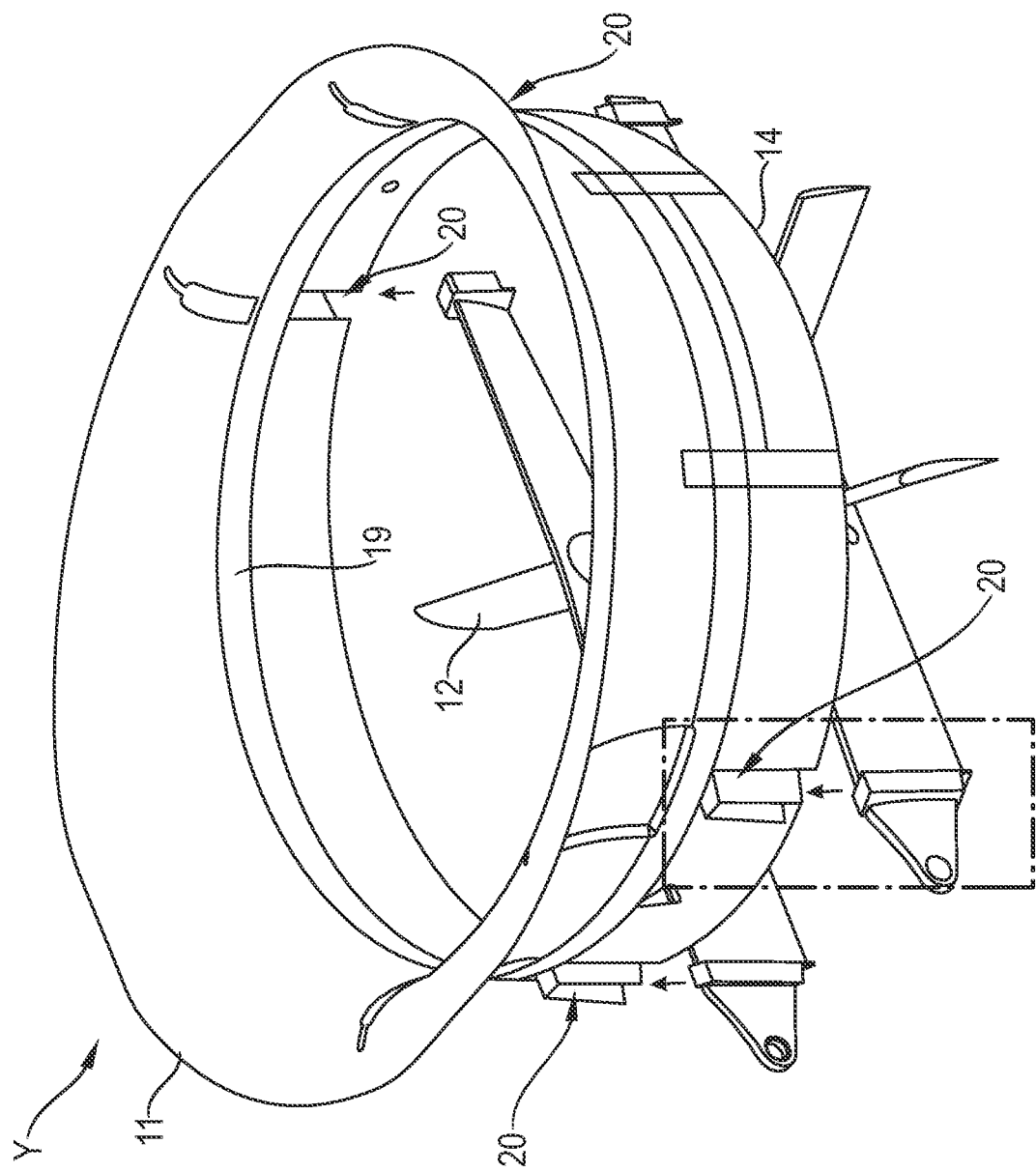
Figure 9:
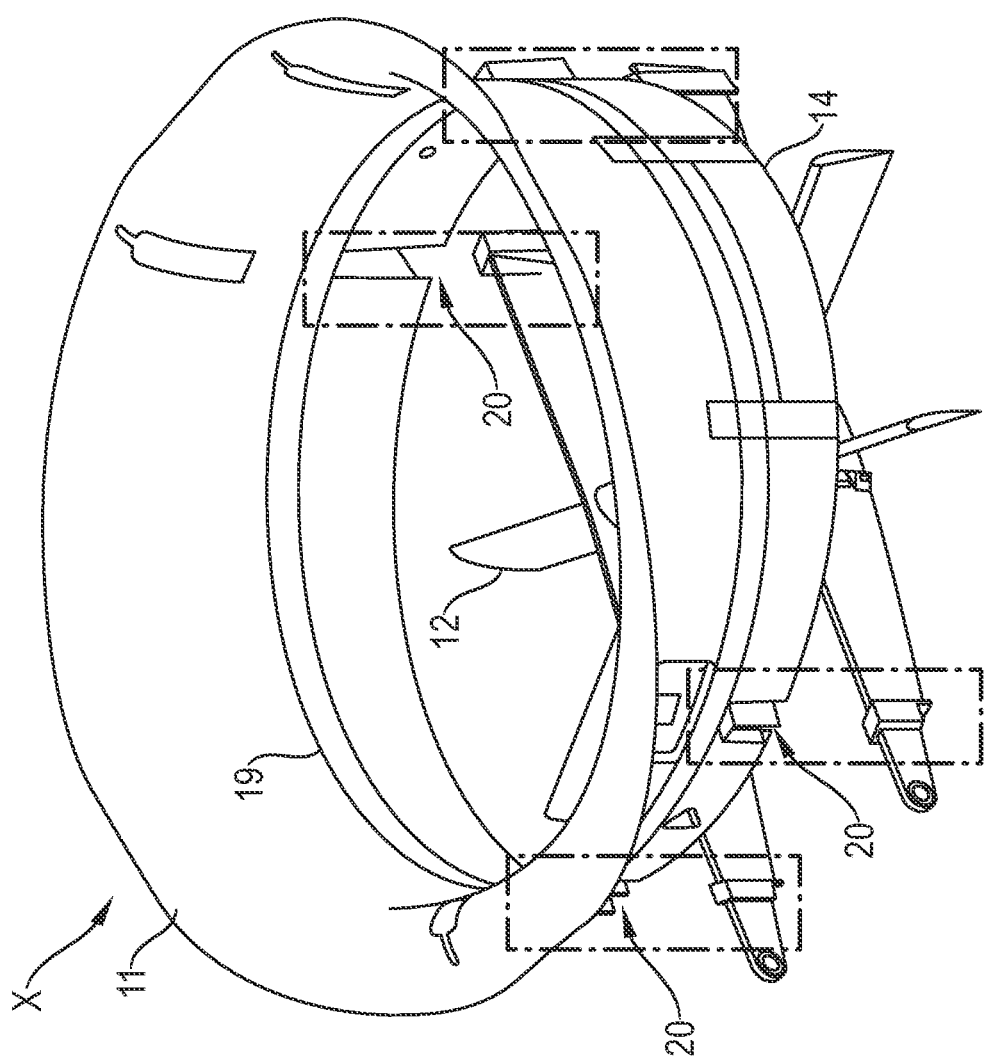

A juxtaposition of FIGS. 7, 8 and 9 illustrates, on the basis of two exemplary ducts of the two construction variants, how the associated guide grille (12) can ultimately, by means of radial cutouts (20) of the outlet modules (14), be fitted into the latter from below as viewed in the figure.

The individual ducts of the fans may for example be assembled from honeycomb cores with inserts, and thereupon preferably coated in multiple layers with CFRP. In the present context, this is to be understood to mean any composite material in which carbon fibers are embedded into a plastics matrix that serves for connecting the fibers and for filling the intermediate spaces. As a matrix, aside from conventional epoxy resin, use may also be made of other thermosets or thermoplastics.

In the present embodiment, the electric motor (13—FIG. 1) is designed as an air-cooled internal-rotor motor with integrated controller. It is self-evident that, in an alternative configuration, use may for example be made of an external-rotor motor or a liquid-type cooling arrangement. Further exemplary options are disclosed for example by DUFFY, Michael, et al. Propulsion scaling methods in the era of electric flight. in: 2018 *AIAA/IEEE Electric Aircraft Technologies Symposium* (*EATS*). IEEE, 2018. pp. 1-23.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A wing for an aircraft, the wing comprising:
   integrated ducts for integrated ducted fans, each of the integrated ducts having a stiffness ring,
   wherein each stiffness ring is made up of separate stiffness boxes and separate circular-arc-shaped ring segments, and
   wherein the stiffness boxes and circular-arc-shaped ring segments have universal interfaces, and
   wherein the stiffness boxes comprise first stiffness boxes and second stiffness boxes, and
   wherein the first stiffness boxes differ from the second stiffness boxes in terms of height.

2. The wing as claimed in claim 1, wherein each of the integrated ducts further comprises an inlet module, wherein each of the integrated ducts have different respective inlet modules, and wherein the first stiffness boxes, the second stiffness boxes, and the ring segments are uniform in all the integrated ducts.

3. The wing as claimed in claim 2, wherein the different respective inlet modules further comprise universal interfaces, and
   wherein the uniform first stiffness boxes, second stiffness boxes, and ring segments interface with the different respective inlet modules of the respective integrated ducts via the universal interfaces of the different respective inlet modules.

4. The wing as claimed in claim 2, wherein the respective integrated ducts further comprise outlet modules, the outlet modules further having universal interfaces,
   wherein the uniform first stiffness boxes, second stiffness boxes, and ring segments are disposed to the universal interfaces of the outlet modules, and
   wherein the different respective inlet modules are disposed to the outlet modules.

5. The wing as claimed in claim 2, wherein the different respective inlet modules are differently shaped with respect to one another.

6. The wing as claimed in claim 1, wherein, in each of the integrated ducts, the integrated duct supports one of the first stiffness boxes, one of the second stiffness boxes, and two of the ring segments, and wherein the two ring segments connect the first stiffness box on diametrically opposite sides of the integrated duct to the second stiffness box.

7. The wing as claimed in claim 6, wherein two adjacent integrated ducts of different construction variants are oriented relative to one another such that the first stiffness boxes of the two integrated ducts face toward one another.

8. The wing as claimed in claim 1, wherein the integrated ducts are in each case made up of inlet modules and outlet modules, and
   wherein the outlet modules support the stiffness rings.

9. The wing as claimed in claim 1, wherein the integrated ducts have honeycomb cores with inserts, and
   wherein the ducts are coated in multiple layers with carbon-fiber-reinforced plastic.

10. The wing as claimed in claim 1, the wing further comprising, in each of the integrated ducts, a guide grille, and an electric motor of the integrated ducted fans supported by the guide grille,
    wherein the respective integrated ducts each further comprise one of a plurality of outlet modules, and
    wherein the outlet modules have cutouts for fitting of the guide grille into the respective one of the integrated ducts.

11. A method for producing the wing as claimed in claim 1, the integrated ducts in each case comprising the stiffness boxes and ring segments, the method comprising:
    inserting the stiffness boxes and ring segments of the integrated ducts into the wing in different installation positions.

* * * * *